US008988991B2

(12) United States Patent
Song

(10) Patent No.: US 8,988,991 B2
(45) Date of Patent: Mar. 24, 2015

(54) ENABLING LOAD BALANCING FOR MPLS-TP

(75) Inventor: Xiaoheng Song, Beijing (CN)

(73) Assignee: Hangzhou H3C Technologies Co., Ltd., Zhejiang (CN)

(*) Notice: Subject to any disclaimer, the term of this patent is extended or adjusted under 35 U.S.C. 154(b) by 311 days.

(21) Appl. No.: 13/567,868

(22) Filed: Aug. 6, 2012

(65) Prior Publication Data

US 2013/0044591 A1 Feb. 21, 2013

(30) Foreign Application Priority Data

Aug. 15, 2011 (CN) .......................... 2011 1 0232561

(51) Int. Cl.
*H04L 12/24* (2006.01)
*H04L 12/723* (2013.01)

(52) U.S. Cl.
CPC ............ *H04L 41/0663* (2013.01); *H04L 45/50* (2013.01)
USPC ....................................................... 370/228

(58) Field of Classification Search
CPC ................ H04L 45/28; H04L 41/0654; H04L 2012/5627
USPC ......................................... 370/228, 225, 216
See application file for complete search history.

(56) References Cited

U.S. PATENT DOCUMENTS

| 2006/0028991 | A1* | 2/2006 | Tan et al. .................. 370/237 |
| 2006/0227743 | A1* | 10/2006 | Ishimori et al. ............ 370/331 |
| 2010/0023801 | A1* | 1/2010 | Coronado et al. ............ 714/5 |
| 2010/0142545 | A1* | 6/2010 | Kurita ......................... 370/401 |

FOREIGN PATENT DOCUMENTS

| CN | 1536832 | 10/2004 |
| CN | 101499957 | 8/2009 |
| CN | 101771551 | 7/2010 |
| CN | 102065020 | 5/2011 |

OTHER PUBLICATIONS

CN First Office Action dated Aug. 29, 2013 issued on CN Patent Application No. 201110232561.0 dated Aug. 15, 2011, The State Intellectual Property Office, P.R. China.

* cited by examiner

*Primary Examiner* — Andrew Lai
*Assistant Examiner* — Zhiren Qin
(74) *Attorney, Agent, or Firm* — Mannava & Kang, P.C.

(57) ABSTRACT

A method of and a device for enabling load balancing for Multiprotocol Label Switching Transport Profile (MPLS-TP) are provided. The method is applied to a process of transmitting data between two Provider Edge (PE) devices that adopt a protection mechanism of primary and backup tunnels. The method comprises allocating, by a source PE device located at a head node of a tunnel, traffic to each of the primary and backup tunnels in a current transmission period based on transmission performance information about each of the primary and backup tunnels in a previous transmission period fed back by a destination PE device located at a tail node of the tunnel, when a set transmission period comes; and obtaining, by said source PE device, the traffic allocated to each of the tunnels and transmitting data to the destination PE device via the corresponding tunnels.

14 Claims, 3 Drawing Sheets

| Function Type (02Hex) | Reserved (00Hex) | Notify Type | TTSI (optional, if not used set to all 00Hex) | Notify Value | Padding (all 00Hex) | BIP16 |
|---|---|---|---|---|---|---|
| 1 octet | 1 octet | 2 octets | 20 octets | 4 octets | 14 octets | 2 octets |

ENABLING LOAD BALANCING FOR MPLS-TP

CLAIM FOR PRIORITY

The present application claims priority under 35 U.S.C 119 (a)-(d) to Chinese Patent application number 201110232561.0, filed on Aug. 15, 2011, which is incorporated by reference herein its entirety.

BACKGROUND

ITU-T (International Telecommunication Union Telecommunication Standardization Sector) and IETF (Internet Engineering Task Force) specify an implementation of ITU-T transmission demand extendible IETF MPLS architecture. These extensions are referred to as MPLS Transport Profile (i.e. MPLS-TP where MPLS is the abbreviation for Multiprotocol Label Switching).

DETAILED DESCRIPTION

Figures 1, 2:
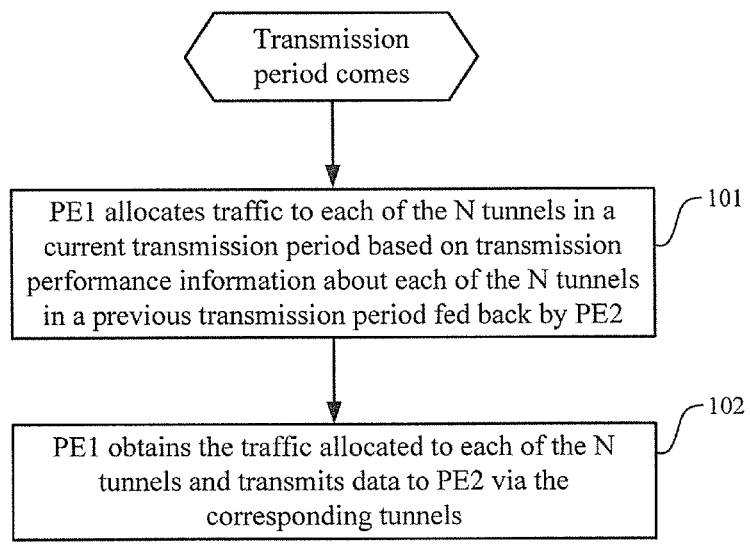
FIG. 1 is a schematic diagram of a flow of balancing load according to an example of the present disclosure.
FIG. 2 is a schematic diagram of a format for an MPLS OAM message in an example of the present disclosure.

The MPLS-TP is a connection-oriented packet-switched network technology, which has the following features:

(1) switching paths using MPLS labels, and hence omitting complicated functions of MPLS signaling and IP;

(2) supporting a multi-service bearer, being independent of a client layer and a control plane, and being capable of operating in various physical layer techniques; and (3) having a strong transmission capability, such as QoS (Quality of Service), OAM (Operation, Administration and Maintenance), and reliability, etc.

In a word, MPLS-TP=MPLS−$L3$ complexity+OAM+ protection.

In order to support a connection-oriented end-to-end OAM model, many connectionless characteristics are excluded from the MPLS-TP, and protection switching of ITU-T transmission style and an OAM function are added, which are favorable for provision of services of a telecommunication level. Meanwhile, the MPLS-TP chooses some features of an MPLS system that are favorable to data service transmission, abandons a complicated control protocol family defined for MPLS by IETF, simplifies a data plane and omits an unnecessary forwarding processing, so that it is more suitable for an operational environment that mainly relies on a TDM (Time Division Multiplexing) service and evolves to IP in an applied scenario.

A typical MPLS-TP tunnel protection generally uses a 1+1 protection mode and a 1:1 protection mode.

In the 1+1 protection mode, a source PE (Provider Edge) device transmits at a head node a tunnel traffic on both a primary tunnel and a backup tunnel, and a receiving device selects at a tail node a currently active tunnel, receives a traffic from the tunnel, and discards a traffic from the other tunnel. The primary tunnel is used normally. When the primary tunnel is unavailable, a switching between the primary and backup tunnels is triggered. The tail node selects an active tunnel, and traffic will be received from the backup tunnel.

In the 1:1 protection mode, the source PE device preselects at the head node an active tunnel and forwards a tunnel traffic on a designated tunnel, and the receiving device receives the traffic at the tail node. The primary tunnel is used normally. When the primary tunnel is unavailable, a switching between the primary and backup tunnels is triggered. The head node chooses to transmit the traffic on the backup tunnel.

The typical MPLS-TP tunnel protection strategy directly uses a common protection strategy of the primary and backup tunnels, so it is impossible to enable load sharing between the primary and backup tunnels.

When implementing a tunnel protection technique in an MPLS-TP network, a plurality of tunnels may be configured to protect one another, wherein the number of primary tunnels is 1 and the number of protection tunnels is N. Even if N backup tunnels are used to protect one primary tunnel, when a switching between the primary and backup tunnels occurs, only one tunnel can be selected from the backup tunnels to be an active tunnel according to a preferred strategy. For ease of use, only one backup tunnel may be used, and the common tunnel protections are a 1:1 tunnel protection mode and a 1+1 tunnel protection mode.

If the 1:1 tunnel protection mode is used, data traffic in the MPLS-TP network is normally transmitted via the primary tunnel. When a fault occurs in the primary tunnel, a PE device will switch user traffic onto the backup tunnel to be transmitted, and after the primary tunnel recovers, the traffic on the backup tunnel will be switched back to the primary tunnel. That is, the backup tunnel normally does not participate in traffic forwarding. However, in fact, the backup tunnel is also a logic channel pre-created on a signaling protocol, which may participate in data message forwarding. User's data traffic can be evenly shared at source and destination nodes, and a destination device can signal the source PE device to adjust the traffic on the primary and backup tunnels in real time.

Based on the above concept, examples of the present disclosure provide a solution for enabling load balancing for MPLS-TP so as to realize load sharing among the primary and backup tunnels. The examples of the present disclosure develop the MPLS-TP tunnel technique and enrich the 1+1, 1:1 and 1:N protection schemes for the MPLS-TP tunnels, making the protection of the MPLS-TP tunnels more efficient and perfect.

The examples of the present disclosure are described in detail below with reference to the drawings.

Referring to FIG. 1, a schematic diagram of a flow of balancing load according to an example of the present disclosure is shown. An MPLS-TP architecture adopted in the flow includes PE1 and PE2 with N (N≥2) tunnels between PE1 and PE2, and these tunnels adopt a protection mechanism of primary and backup tunnels. For data transmission between the PEs, transmission periods are specified in a system, and in each transmission period, a source PE device performs load balancing among the tunnels based on transmission performance of each tunnel fed back by a destination PE device. A length of a transmission period may be set according to a practical need or a network environment. For example, in case of a stable network environment, a longer transmission period may be set so as to reduce a burden of performing calculation and processing for balancing load on the PE devices; and in case of a less stable network environment, a shorter transmission period may be set so as to timely perform the calculation and processing for balancing load based on tunnel variations. Moreover, the example of the present disclosure requires the destination PE device (i.e. a PE device located at a tail node of a tunnel) to periodically feed back transmission performance information about each tunnel to the source PE device (i.e. a PE device located at a head node of the tunnel), so that the source PE device may perform load balancing among the tunnels based on the information.

The flow shown in FIG. 1 depicts a process of enabling load balancing by taking data transmission from PE1 to PE2 as an example. As illustrated, when a transmission period comes, the flow may include blocks 101 and 102. In block 101, PE1 allocates traffic to each of the N tunnels in a current transmission period based on transmission performance information about each of the N tunnels in a previous transmission period fed back by PE2. In block 102, PE1 obtains the traffic allocated to each of the N tunnels and transmits data to PE2 via the corresponding tunnels.

PE2 may feed back to PE1 the transmission performance information about each of the N tunnels when the transmission period comes, or it may feed back to PE1 the transmission performance information about each of the N tunnels based on a set feedback period. In the latter case, the feedback period should be set in such a way as to enable PE1 to receive the transmission performance information about each of the N tunnels in the previous transmission period fed back by PE2 upon or prior to reaching the transmission period.

In each transmission period, PE1 performs load sharing for data transmitted to PE2 on the N tunnels in the above-mentioned manner, thus during the whole transmission process, load sharing for the traffic from PE1 to PE2 on the N tunnels is realized.

In the above flow, the source PE device allocates traffic based on the transmission performance information about each tunnel sent from the peer PE in each transmission period, regardless of whether there is any data message to be transmitted at this time. If there are data messages to be transmitted, traffic allocation of each tunnel is obtained during the transmission (e.g. parameters of the load sharing) and the data messages are transmitted in sequence according to these parameters. It can be seen that in the example of the present disclosure, no software intervention is needed during data forwarding, while as for the software, it is only required to maintain tunnel information in a load balancing module. Transmitting data messages and allocating tunnel traffic are asynchronous, and a relationship therebetween is that parameters of the load sharing need to be obtained before transmitting the data messages, and then the data messages are transmitted.

Various examples of the destination PE device (i.e. PE2) feeding back the transmission performance information about the tunnels and the source PE device (i.e. PE1) performing the traffic load sharing in the above-mentioned flow are described in detail below.

In order to feed back the transmission performance information about each tunnel from the destination PE device to the source PE device, in the example of the present disclosure, an inverse MPLS tunnel is established between the source PE device and the destination PE device, and the destination PE device may feed back the transmission performance information about N tunnels to the source PE device via the established inverse MPLS tunnel. Of course, if there is already the inverse tunnel between the source PE device and the destination PE device, the transmission performance information about N tunnels may be fed back to the source PE device via the inverse tunnel.

In an example, the transmission performance information about N tunnels may be transmitted together to the source PE device through an indicator message, or indicator messages may be transmitted in sequence to the source PE device so as to transmit the transmission performance information about each tunnel to the source PE device, wherein each message is only used to transmit transmission performance information about one tunnel. The transmission performance information herein may be statistical information obtained by the destination PE device based on message reception conditions, such as the statistical number of messages received from each of the tunnels, a delay or a packet loss rate, etc., or any combination thereof.

The indicator message may directly use an OAM protocol message after some proper extension to the protocol message is made. Such messages as CV (Connectivity Verification), FFD (Fast Failure Detection), BDI (Backward Defect Indicator), and FDI (Forward Defect Indicator) of MPLS OAM all use reserved 14 labels as a load identity, and behind the 14 labels, there is an MPLS OAM message load of 44 octets as shown in FIG. 2. Currently, seven types of MPLS OAM messages may be differentiated according to their functions, and table 1 shows the seven types of messages as well as their values and meanings in an OAM function type codepoint field:

TABLE 1

| OAM function type codepoint (Hex) | First octet of OAM packet payload function type and purpose |
| --- | --- |
| 00 | Reserved |
| 01 | CV (Connectivity Verification) |
| 02 | FDI (Forward Defect Indicator) |
| 03 | BDI (Backward Defect Indicator) |
| 04 | Reserved for Performance packets |
| 05 | Reserved for LB-Req (Loopback Request) |
| 06 | Reserved for LB-Rsp (Loopback Response) |

On the basis of these existing OAM function types, the example of the present disclosure makes some proper extension. For example, a new type of OAM function type codepoint is added as 07 to be used for BNI (Backward Notify Indicator), and a data packet structure thereof may be as shown in FIG. 2. The Notify Value carries information about the indicated tunnel, such as information including a current traffic, a delay, a packet loss rate, etc.

The transmission performance information about each tunnel fed back by the destination PE device will be used as the basis for the source PE device to balance traffic load among the tunnels. The source PE device of the MPLS-TP tunnel, after receiving the information, readjusts a forwarding strategy of N tunnels to reallocate the traffic to each of the tunnels, thereby flexibly controlling the traffic carried on the tunnels. If traffic of a certain tunnel that carries data traffic is too large, the traffic allocated to the tunnel in a next time slot will be reduced. Likewise, if the traffic of a certain tunnel is too small, the traffic allocated to the tunnel in the next time slot will be increased.

As for block 102 in the flow shown in FIG. 1, the example of the present disclosure enables load sharing in the MPLS tunnels by means of time division multiplexing based on QoS instead of using header content of an original message as a KEY of Hash algorithm. Specifically, the source PE device allocates to each of the tunnels a time slot occupied for transmitting data in a current transmission period based on the transmission performance information about each of the primary and backup tunnels in a previous transmission period, wherein a time slot allocated to a tunnel with a high transmission performance is longer than a time slot allocated to a tunnel with a low transmission performance, and time slots allocated to the tunnels do not overlap one another to make sure that data is transmitted via only one tunnel in the current moment. After allocating the time slots for data transmission to the tunnels, the source PE device, in the time slots allocated to the corresponding tunnels, transmits data to the destination PE device via the tunnels. For example, the source PE device selects an outgoing interface of the corresponding tunnel when the corresponding time slot comes based on time slot allocation of each tunnel, and forwards data messages via the outgoing interface.

In an example, the source PE device determines a transmission performance proportion of each of the tunnels based on the transmission performance information about each of the tunnels, and divides the current transmission period into a number of time slots. Then, the source PE device allocates the time slots of the current transmission period to the tunnels based on the transmission performance proportions of the tunnels. The source PE device transmits data to a tunnel to be transmitted only in the time slot allocated to the tunnel, so that each of the tunnels can transmit data only in the time slot allocated thereto, but it cannot transmit data in the time slot that is not allocated to it. In this case, only one tunnel carries data traffic at the current moment. When dividing the current transmission period into time slots, a tunnel with the worst transmission performance is guaranteed to have at least one time slot allocated thereto. When all the tunnels have the same transmission performance (e.g. a QoS attribute), each of the tunnels has the same number of time slots allocated thereto.

For example, there are three tunnels between PE1 and PE2, and PE1 calculates that transmission performance proportions of tunnel 1, tunnel 2 and tunnel 3 are 1:2:3 based on a transmission performance parameter of each tunnel fed back by PE2 (wherein tunnel 3 has the best transmission performance). In this case, PE1 may divide a current transmission period into 6 time slots, and allocate one time slot (e.g. time slot 1) to tunnel 1, two time slots (e.g. time slot 2 and time slot 3) to tunnel 2, and three time slots (e.g. time slots 4-6) to tunnel 3. Hence, PE1 transmits data via tunnel 1 in time slot 1, transmits data via tunnel 2 in time slots 2 and 3, and transmits data via tunnel 3 in time slots 4-6. It can be seen that after calculating the transmission performance proportions of the tunnels, by using a sum of values of the proportions (or an integral multiple of the sum) as the number of time slots of the current transmission period (for example, 1+2+3=6 in case of the above-mentioned 1:2:3), it is guaranteed that each tunnel has at least one time slot allocated thereto.

It can be seen that by dividing time slots for N tunnels according to a certain proportion, there is traffic on only one tunnel in each time slot, while there is no traffic on other tunnels, so that an even load on the tunnels can be realized in one transmission period.

If a bandwidth reservation is realized on public network tunnels of the MPLS-TP, equal and balanced load on the tunnels can be realized in this way. For example, there are N MPLS-TP tunnels, and their bandwidths are respectively d1, d2, . . . , dn. A bandwidth of user's VPN (Virtual Private Network) service carried on the N tunnels may be greater than a single MPLS-TP tunnel. So all the existing MPLS-TP tunnels cannot meet the requirement, and when the user's VPN service is carried on an MPLS-TP tunnel, a priority packet loss occurs. If these N MPLS-TP tunnels are aggregated, equal load balancing can be realized among the MPLS-TP tunnels, and the user's VPN traffic is evenly shared among the MPLS-TP tunnels.

Figure 3:
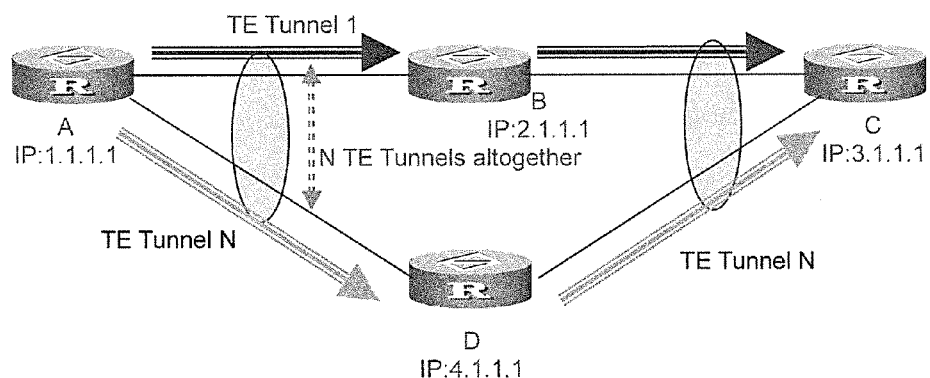
FIG. 3 is a schematic diagram of tunnel aggregation in an example of the present disclosure.

In the example of the present disclosure, further, the MPLS-TP tunnels may also form a tunnel equalization group. The N tunnels are member tunnels of the tunnel equalization group, and each of the MPLS-TP tunnels is detected through MPLS OAM to monitor connectivity of the tunnels in real time, as shown in FIG. 3.

After setting the tunnel equalization group, state changes of the member tunnels may influence a state of the whole tunnel equalization group. State changes of the tunnel equalization group include the following cases:

a first case: there is at first no member tunnel in the tunnel equalization group, after a first member tunnel is added, the state of the tunnel equalization group changes from DOWN to UP, and the bandwidth thereof is the bandwidth of the first member tunnel;

a second case: there are member tunnels in the tunnel equalization group at first, when one more member tunnel is added, the state of the tunnel equalization group does not change, which is still UP, and the bandwidth thereof is a sum of the bandwidths of the member tunnels;

a third case: there are member tunnels in the tunnel equalization group, when one member tunnel exits, there are still other member tunnels, and the state of the tunnel equalization group does not change, which is still UP, and the bandwidth thereof is a sum of the bandwidths of the remaining member tunnels; and a fourth case: when the last member tunnel of the tunnel equalization group exits, the state of the tunnel equalization group changes from UP to DOWN, indicating that the tunnel equalization group is unavailable.

The bandwidth of the tunnel equalization group is equal to a sum of the bandwidths of all the member tunnels, and the tunnel equalization group needs to respond to a detection state indicator of a single tunnel in real time. When a state of a tunnel changes from DOWN to NORMAL, a bandwidth of the tunnel is added to the bandwidth of the tunnel equalization group. That is, the tunnel is added to the tunnel equalization group as a member thereof. At this time, user traffic is shared evenly among the member tunnels of the tunnel equalization group. When a state of a tunnel changes from NORMAL to DOWN, a bandwidth of the tunnel is subtracted from the bandwidth of the tunnel equalization group. That is, the tunnel exits from the tunnel equalization group. At this time, user traffic is shared among the remaining member tunnels of the tunnel equalization group.

Based on the same technical concept, the examples of the present disclosure also provide a PE device, which may be applied to the above-mentioned flow.

Figure 4:
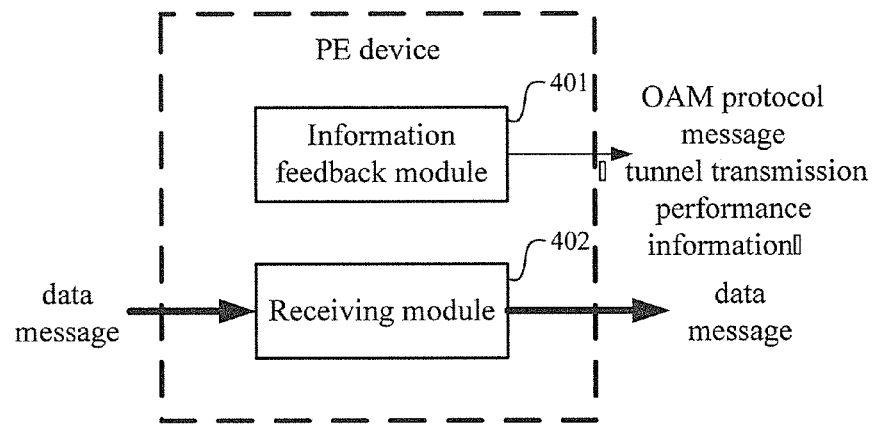
FIG. 4 is a schematic block diagram of a PE device according to an example of the present disclosure.

Referring to FIG. 4, a schematic block diagram of a PE device according to an example of the present disclosure is shown. There are at least two tunnels between the PE device and a peer PE device, and a protection mechanism of primary and backup tunnels is used. The PE device is a destination PE device located at a tail node of a tunnel, and as illustrated, the PE device may comprise:

an information feedback module 401 to periodically feed back transmission performance information about each of the primary and backup tunnels to a source PE device located at a head node of the tunnel (e.g. feed back the transmission performance information about each of the primary and backup tunnels in a previous transmission period); the transmission performance information about the tunnels fed back by the information feedback module may include one of or any combination of the following information: the number of received messages, a data transmission delay, and a packet loss rate; and a receiving module 402 to receive data transmitted by the source PE device located at the head node of the tunnel, wherein said source PE device is to allocate traffic to each of the primary and backup tunnels in a current transmission period based on the transmission performance information about each of the primary and backup tunnels in the previous transmission period fed back by the destination PE device located at the tail node of the tunnel when a set transmission period comes, obtain the traffic allocated to the tunnels, and transmit data to the destination PE device via the corresponding tunnels.

Further, the information feedback module 401 may comprise an extended OAM protocol message, which feeds back the transmission performance information about each of the primary and backup tunnels to the source PE device.

Figure 5:
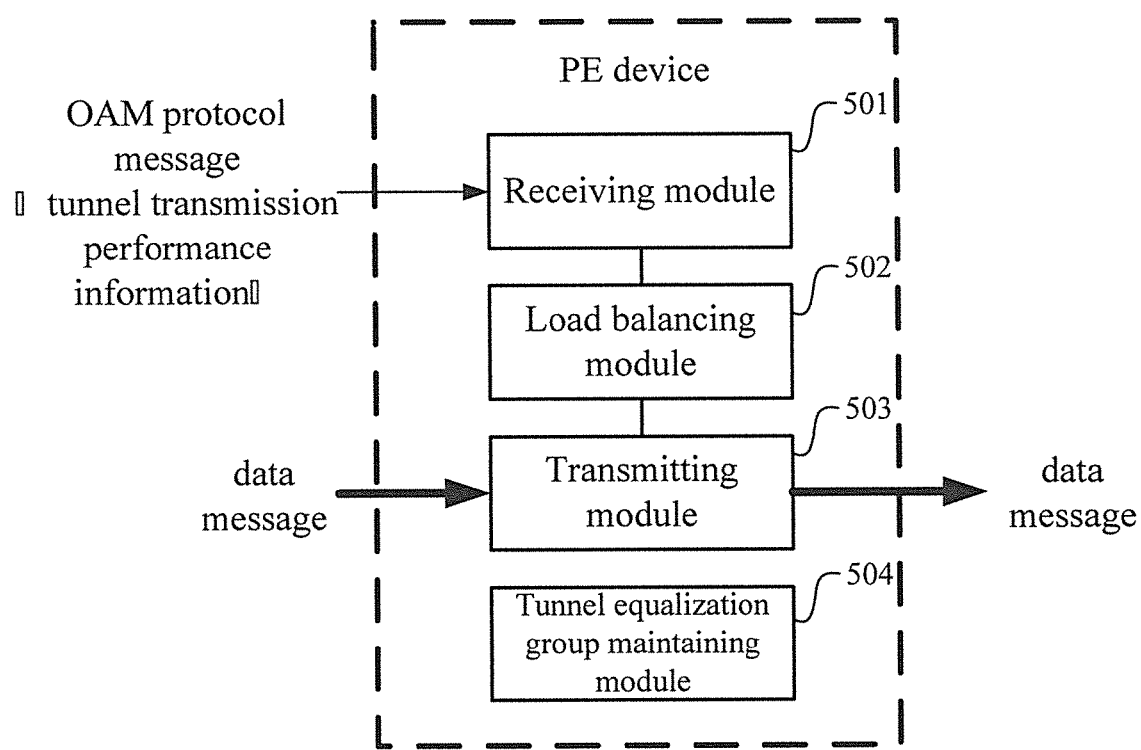
FIG. 5 is a schematic block diagram of a PE device according to a further example of the present disclosure.

Referring to FIG. 5, a schematic block diagram of a PE device according to a further example of the present disclosure is shown. There are at least two tunnels between the PE device and a peer PE device, and a protection mechanism of primary and backup tunnels is used. The PE device is a source PE device located at a head node of a tunnel, and as illustrated, the PE device may comprise:

a receiving module 501 to receive transmission performance information about each of the primary and backup tunnels fed back periodically by a destination PE device located at a tail node of the tunnel;

a load balancing module 502 to allocate traffic to each of the primary and backup tunnels in a current transmission period based on the transmission performance information about each of the primary and backup tunnels in a previous transmission period fed back by the destination PE device located at the tail node of the tunnel when a set transmitting period comes; and a transmitting module 503 to obtain the traffic allocated to each of the tunnels, and transmit data to the destination PE device via the corresponding tunnels.

Further, the load balancing module 502 may allocate to each of the tunnels a time slot occupied for transmitting data in the current transmission period based on the transmission performance information about each of the primary and backup tunnels in the previous transmission period, wherein a time slot allocated to a tunnel with a high transmission performance is longer than a time slot allocated to a tunnel with a low transmission performance, and time slots allocated to the tunnels do not overlap one another. Accordingly, the transmitting module 503 may transmit the obtained data to the destination PE device via the tunnels in the time slots allocated to the tunnels by the load balancing module 502. In an example, the load balancing module 502 may determine a transmission performance proportion of each of the primary and backup tunnels based on the transmission performance information, divide the current transmission period into a number of time slots, and then allocate the time slots of the current transmission period to the primary and backup tunnels based on the transmission performance proportion of each of the primary and backup tunnels, wherein when dividing the current transmission period into time slots, a tunnel with the worst transmission performance is guaranteed to have at least one time slot allocated thereto.

In the above-mentioned PE device, the primary and backup tunnels are member tunnels of a tunnel equalization group. Accordingly, the PE device may also comprise a tunnel equalization group maintaining module 504 that removes a member tunnel from the tunnel equalization group when a state of the member tunnel of the tunnel equalization group changes from NORMAL to DOWN, and adds a tunnel to the tunnel equalization group when a state of the tunnel changes from DOWN to NORMAL. Accordingly, the load balancing module 502 allocates traffic to each of the member tunnels in the tunnel equalization group in the current transmission period.

In an example, the load balancing module 502 in the above-mentioned device receives in each transmission period an OAM message transmitted from the peer PE, and allocates traffic to the MPLS-TP tunnels in the tunnel equalization group through information carried in the OAM message regardless of whether the transmitting module 503 has any data message to be transmitted at this time. If the transmitting module 503 has data messages to be transmitted, it obtains a time slot parameter of each of the tunnels from the load balancing module 502 during the transmission, and transmits the messages in sequence according to these parameters. Such processing as transmission, reception and analysis of the OAM message as well as maintenance of the tunnel equalization group (bandwidth, allocation of time slots, and tunnel state UP/DOWN) is realized by software. In terms of hardware, data messages are transmitted according to time slots and bandwidths.

In the examples of the present disclosure, by setting transmission periods and requesting the destination PE device to feed back the transmission performance information about each of the primary and backup channels to the source PE device, when a transmission period comes, the source PE device may allocate traffic to each of the primary and backup tunnels in a current transmission period based on the transmission performance information about each of the primary and backup tunnels in a previous transmission period fed back by the destination PE device, and may transmit the obtained data to the destination PE device via the corresponding tunnels based on situations of allocation, thus enabling load balancing among the primary and backup tunnels in real time based on transmission performance of each of the primary and backup tunnels.

In summary, the examples of the present disclosure expand the MPLS-TP tunnel technique, realize complete sharing of load, and provide a more efficient protection measure and tunnel load balancing technique.

The above examples can be implemented by hardware, software or firmware or a combination thereof. For example, the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a "processor" should thus be interpreted to mean "one or more processors". The processes, methods and functional modules may be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the examples of the present disclosure.

All of the features disclosed in this specification (including any accompanying claims, abstract and drawings), and/or all of the processes or blocks of any method so disclosed, may be combined in any combination, except combinations where at least some of such features and/or processes or blocks are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The figures are only illustrations of an example, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

Although the flow diagrams described above show a specific order of execution, the to order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

What is claimed is:

1. A method of enabling load balancing for Multiprotocol Label Switching Transport Profile (MPLS-TP), applied to a process of transmitting data between two Provider Edge (PE) devices that adopt a protection mechanism of primary and backup tunnels, wherein the method comprises:
   allocating, by a source PE device located at a head node of a tunnel, traffic to each of the primary and backup tunnels in a current transmission period based on transmission performance information about each of the primary and backup tunnels in a previous transmission period fed back by a destination PE device located at a tail node of the tunnel, when a set transmission period comes, wherein said allocating comprises:
      allocating, by said source PE device, time slots to both the primary and backup tunnels for transmitting data in the current transmission period based on the transmission performance information about each of the primary and backup tunnels in the previous transmission period, wherein the time slots allocated to both the primary and backup tunnels do not overlap with one another; and
   obtaining, by said source PE device, the traffic allocated to each of the tunnels and transmitting data to the destination PE device in the time slots via the primary and backup tunnels.

2. The method as claimed in claim 1, wherein the transmission performance information about the tunnels comprises one of or any combination of the following information: a number of received messages, a data transmission delay, and a packet loss rate.

3. The method as claimed in claim 1, wherein said destination PE device feeds back the transmission performance information about each of the primary and backup tunnels to said source PE device by means of an extended Operation, Administration and Maintenance (OAM) protocol message.

4. The method as claimed in claim 1,
   wherein a time slot of the time slots allocated to a tunnel of the primary or backup tunnels with a high transmission performance is longer than a time slot of the time slots allocated to a tunnel of the primary or backup tunnels with a low transmission performance.

5. The method as claimed in claim 4, wherein said allocating to each of the tunnels a time slot occupied for transmitting data in the current transmission period based on the transmission performance information about each of the primary and backup tunnels in the previous transmission period comprises:
   allocating a plurality of the time slots of the current transmission period to each of the primary and backup tunnels based on the transmission performance proportion of each of the primary and backup tunnels, wherein when dividing the current period into time slots, a tunnel with the worst transmission performance is guaranteed to have at least one time slot allocated thereto.

6. The method as claimed in claim 1, wherein each of the primary and backup tunnels is a member tunnel of a tunnel equalization group, and wherein the method further comprises: when a state of a member tunnel of said tunnel equalization group changes from NORMAL to DOWN, removing the member tunnel from the tunnel equalization group, and when a state of a tunnel changes from DOWN to NORMAL, adding the tunnel to the tunnel equalization group; and
   wherein said allocating traffic to each of the primary and backup tunnels in the current transmission period comprises allocating traffic to each of the member tunnels in said tunnel equalization group in the current transmission period.

7. A destination Provider Edge (PE) device for setting up at least two tunnels between said destination PE device and a peer PE device and a protection mechanism of primary and backup tunnels, said destination PE device located at a tail node of a tunnel, wherein said destination PE device comprises:
   an information feedback module to periodically feed back transmission performance information about each of the primary and backup tunnels to a source PE device located at a head node of the tunnel; and
   a receiving module to receive data transmitted by the source PE device located at the head node of the tunnel,
   wherein said source PE device is to allocate traffic to each of the primary and backup tunnels in a current transmission period based on the transmission performance information about each of the primary and backup tunnels in a previous transmission period fed back by the destination PE device located at the tail node of the tunnel when a set transmission period comes,
   wherein to allocate the traffic, the source PE device is to allocate time slots to both the primary and backup tunnels for transmitting data in the current transmission period based on the transmission performance information about each of the primary and backup tunnels in the previous transmission period, wherein the time slots allocated to both the primary and backup tunnels do not overlap with one another, and
   the source PE device is to obtain the traffic allocated to each of the tunnels, and transmit data to the destination PE device in the time slots via the primary and backup tunnels.

8. The destination PE device as claimed in claim 7, wherein the transmission performance information about the tunnels fed back by said information feedback module comprises one of or any combination of the following information: a number of received messages, a data transmission delay, and a packet loss rate.

9. The destination PE device as claimed in claim 7, wherein said information feedback module is to feed back the transmission performance information about each of the primary and backup tunnels to said source PE device by means of an extended Operation, Administration and Maintenance (OAM) protocol message.

10. The destination PE device as claimed in claim 7, wherein the source PE device is to allocate a plurality of the time slots of the current transmission period to each of the primary and backup tunnels based on the transmission performance proportion of each of the primary and backup tunnels, wherein when dividing the current period into time slots, a tunnel with the worst transmission performance is guaranteed to have at least one time slot allocated thereto.

11. A Provider Edge (PE) device for setting up at least two tunnels between said PE device and a peer PE device and a protection mechanism of primary and backup tunnels, said PE device being a source PE device located at a head node of a tunnel, wherein said PE device comprises:
   a receiving module to receive transmission performance information about each of the primary and backup tunnels fed back periodically by a destination PE device located at a tail node of the tunnel;
   a load balancing module to allocate traffic to each of the primary and backup tunnels in a current transmission period based on the transmission performance information about each of the primary and backup tunnels in a previous transmission period fed back by the destination PE device located at the tail node of the tunnel when a set transmission period comes,
   wherein to allocate the traffic, the load balancing module is to allocate time slots to both the primary and backup tunnels for transmitting data in the current transmission period based on the transmission performance information about each of the primary and backup tunnels in the previous transmission period, wherein the time slots allocated to both the primary and backup tunnels do not overlap with one another; and
   a transmitting module to obtain the traffic allocated to each of the tunnels, and transmit data in the time slots to the destination PE device via the primary and backup tunnels.

12. The PE device as claimed in claim 11, wherein a time slot of the time allocated to a tunnel of the primary and backup tunnels with a high transmission performance is longer than a time slot allocated to a tunnel of the primary and backup tunnels with a low transmission performance.

13. The PE device as claimed in claim 12, wherein said load balancing module is to allocate a plurality of the time slots of the current transmission period to each of the primary and backup tunnels based on the transmission performance proportion of each of the primary and backup tunnels, wherein when dividing the current period into time slots, a tunnel with the worst transmission performance is guaranteed to have at least one time slot allocated thereto.

14. The PE device as claimed in claim 11, wherein each of the primary and backup tunnels is a member tunnel of a tunnel equalization group;
   wherein said PE device further comprises a tunnel equalization group maintaining module to remove a member tunnel from the tunnel equalization group when a state of the member tunnel of said tunnel equalization group changes from NORMAL to DOWN, and add a tunnel to the tunnel equalization group when a state of the tunnel changes from DOWN to NORMAL; and
wherein said load balancing module is to allocate traffic to each of the member tunnels in said tunnel equalization group in the current transmission period.

\* \* \* \* \*